United States Patent
Li

(10) Patent No.: US 12,105,894 B2
(45) Date of Patent: Oct. 1, 2024

(54) KEY TRIGGERING METHOD

(71) Applicant: G.Tech Technology Ltd, Zhuhai (CN)

(72) Inventor: Baisong Li, Zhuhai (CN)

(73) Assignee: G.Tech Technology Ltd, Zhuhai (CN)

( * ) Notice: Subject to any disclaimer, the term of this patent is extended or adjusted under 35 U.S.C. 154(b) by 34 days.

(21) Appl. No.: 18/121,014

(22) Filed: Mar. 14, 2023

(65) Prior Publication Data

US 2024/0134466 A1 Apr. 25, 2024
US 2024/0231508 A9 Jul. 11, 2024

(30) Foreign Application Priority Data

Oct. 19, 2022 (CN) .......................... 202211276738.1

(51) Int. Cl.
*G06F 3/023* (2006.01)

(52) U.S. Cl.
CPC .................................. *G06F 3/023* (2013.01)

(58) Field of Classification Search
CPC ...................................................... G06F 3/023
See application file for complete search history.

(56) References Cited

U.S. PATENT DOCUMENTS

| 2015/0298001 | A1  | 10/2015 | Soelberg |           |
|--------------|-----|---------|----------|-----------|
| 2017/0168574 | A1* | 6/2017  | Zhang    | G06F 3/016 |
| 2023/0034687 | A1* | 2/2023  | Hsu      | H01H 13/83 |

FOREIGN PATENT DOCUMENTS

CN 111625106 A 9/2020

* cited by examiner

*Primary Examiner* — Kwang-Su Yang
(74) *Attorney, Agent, or Firm* — Bayramoglu Law Offices LLC

(57) ABSTRACT

A key triggering method is provided. The key triggering method is sensitive to trigger and suitable for fast repeated pressing. The key triggering method includes: presetting a trigger threshold; detecting, by a combination of a main controller and a sensor, a displacement stroke and displacement direction of a key; determining whether a movement distance of the key in a current displacement direction is greater than the trigger threshold; and switching the key between an on state and an off state according to a determination result. The key triggering method can sensitively identify a user's action for fast repeated pressing.

10 Claims, 3 Drawing Sheets

KEY TRIGGERING METHOD

CROSS REFERENCE TO THE RELATED APPLICATIONS

This application is based upon and claims priority to Chinese Patent Application No. 202211276738.1, filed on Oct. 19, 2022, the entire contents of which are incorporated herein by reference.

TECHNICAL FIELD

The present disclosure applies to the technical field of input device triggering methods, and in particular, relates to a key triggering method.

BACKGROUND

The commonly used keyboards in daily life are mainly membrane keyboards and mechanical keyboards. The key action is detected based on the on-off of a conductive part inside the switch during the key pressing process. The on-off signal is acquired by a main control chip to determine the key action. The on-off position depends on a mechanical structure, and the trigger stroke of the key cannot be adjusted by the user.

The application of the magnetic axis keyboard is increasingly popular. The distance between the key and a magnet on the switch axis is detected by a Hall element to reflect the displacement of the key being pressed to determine the press and release actions of the key. The trigger position of the key is set and adjusted through software.

For example, Chinese patent application CN111625106A provides a technical solution for adjusting a trigger stroke by a sensor (such as a magnetic sensor or a pressure sensor) capable of detecting a key displacement distance. It discloses a method and device for defining a keyboard switch trigger position. The device includes a main control integrated chip (IC) and a key signal processing module. The main control IC and the key signal processing module cooperate to set a key trigger stroke position to meet the needs of different users for different key trigger strokes. However, in this solution, the trigger stroke needs to be preset through the main control IC, and each press of the key relies on a preset trigger point to realize the key function. Similarly, US patent 2015/0298001 A1 discloses a programmable actuation inputs of an accessory and methods thereof. In the technical solutions, users can preset actuation thresholds, and a system performs a comparison between the depression ranges done by users and the actuation thresholds, and when the depression ranges are at or exceeds the actuation thresholds, the system output is performed. Therefore, the depression ranges rely on preset actuation thresholds to realize the system output.

In some application scenarios, fast users will fast-press the key to input the same character. However, because each input must be triggered at the specified trigger point, there is often a case of missing input due to an insufficiently raised height when the same character is fast-pressed.

Specific application scenarios are as follows. 1. During game operation, a slight movement, skill release, or ordinary attack is carried out through a specific key. To ensure operation accuracy or fast skill-releasing, it is usually necessary to repeatedly press the same key fast to achieve an instruction input. 2. In the drawing software AutoCAD or image processing software Adobe Photoshop, to achieve fine operation, the graphic position is often moved by a keyboard operation. The graphic will be moved according to a corresponding moving pixel under magnification. To ensure the adjustment effect, a certain amount of operation space is generally reserved, rather than an adjustment space of only one or two pixels. It is necessary to operate the direction key fast to improve efficiency.

The above key operation refers to a plurality of click operations achieved through repeated clicks, rather than the triggering of instructions corresponding to a long-time on signal achieved through a long press. Therefore, to avoid missing input, it is necessary for the input device to sensitively identify the fast repeated click operation. However, the existing preset trigger point mode is only suitable for the press touch rather than the operation intention of the user.

Specifically, the user intends to press the key down for a short stroke to generate a key on signal (regardless of the initial position of the switch), or to raise the key up for a short stroke to generate a key off signal (regardless of the position of the key after being pressed down). In the process of key on and off, the user does not care whether the key passes through a certain trigger point. The user expects to turn the switch on by pressing it down or turn it off by raising it. In particular, when it is necessary to repeatedly press the key to turn the switch on and off, due to the user's fast speed, it is impossible to ensure that each press or raise of the key reaches a certain height. That is, it is impossible to ensure that each press or raise of the key passes through the trigger point. Therefore, once there is a missed trigger, it will affect the user's operation accuracy and operation experience.

SUMMARY

In order to overcome the shortcomings of the prior art, the present disclosure provides a key triggering method that is sensitive to trigger and suitable for fast repeated pressing.

The present disclosure adopts the following technical solution. The key triggering method is implemented through a main controller for receiving an electrical signal fed back by a sensor and the sensor for detecting a displacement variable s of a key, and includes the following triggering steps:

S1: when the sensor detects that the key is in a natural state, determining, by the main controller, that the key is in an off state, and initializing a stroke holding variable p to 0;

S2: determining, by the main controller, a switch state of the key, and determining whether a total value change trend of the displacement variable s is increasing or decreasing;

S3: when a value change trend of the displacement variable s is the same as the total value change trend and a value of the stroke holding variable p is unlocked, keeping, by the main controller, the value of the stroke holding variable p synchronized with a value of the displacement variable s;

S4: when the value change trend of the displacement variable s changes, locking the value of the stroke holding variable p to the value of the displacement variable s before the change;

S5: when an absolute value of a relative movement of the key, namely $|s-p|$, satisfies $|s-p|>d$, d being a trigger threshold, switching the switch state of the key and the total value change trend to opposites of a current switch state and a current total value change trend, respectively; and unlocking the value of the stroke holding variable p, and restoring synchronization of the value of the stroke holding variable p with the value of the displacement variable s; and S6: repeating steps S2 to S5 until the key restores to the natural state, and returning to step S1.

In the above solution, the sensor is configured to detect the key displacement variable and obtain the displacement when the key is pressed. The change of displacement is used as a trigger mechanism of the key. The displacement is compared with a set trigger threshold to determine whether to trigger the key. This trigger mechanism is applicable to both press and raise processes. During repeated key operations, even if the height of each press is not fixed, the trigger mechanism can still sensitively detect the action that meets the trigger threshold of relative displacement and complete the trigger on-off switch, thus improving the user's operation efficiency. The main controller is configured to obtain an electrical signal recognized and fed back by the sensor so as to obtain the displacement variable s of the key, and determine the current movement direction of the key according to the change of the displacement variable s. When the direction changes, that is, when the displacement variable s decreases or increases, the stroke holding variable p is locked as the displacement variable s of a change point to establish a new determination basis for a trigger state switch. Further, it is determined whether the distance between the key position and the position of the locked stroke holding variable p is greater than the trigger threshold d by the following displacement variable s. If yes, the key state switch is executed to realize the on and off state of the key, so as to transmit a keyboard code signal to a computer for character input. The above solution changes the determination basis during pressing, and detects the user's intention to change the trigger state of the key, thus improving the detection sensitivity. In addition, the above solution does not need to change the user's logic of normal key operation, and can meet the user's response sensitivity under special circumstances, thus reducing the user's learning costs and improving the user experience.

In a preferred solution, step S5 specifically further includes: when the value change trend of the displacement variable s is restored to the current total value change trend and the value of the displacement variable s is equal to the value of the stroke holding variable p, unlocking the value of the stroke holding variable p, restoring synchronization of the value of the stroke holding variable p with the value of the displacement variable s, and returning to step S3.

In a preferred solution, a maximum stroke of the key is L, and a setting range of the trigger threshold d is 0<d≤L.

In a preferred solution, the key triggering method further includes step S01 before step S1: setting, by a user, the trigger threshold d for a key displacement through the main controller.

In a preferred solution, the key triggering method further includes step S02 before step S1: setting, by a user, a reset value RST of the key through the main controller, where in steps S2 to S6, when the displacement variable s is less than the reset value RST, the state of the key is forcibly switched to an off state, and the stroke holding variable p is initialized to 0.

In a preferred solution, the trigger threshold d includes a relative trigger threshold d1 for pressing and a relative trigger threshold d2 for raising; and in steps S1 to S6, when the displacement variable s increases, the trigger threshold d is equal to the relative trigger threshold d1 for pressing, and when the displacement variable s decreases, the trigger threshold d is equal to the relative trigger threshold d2 for raising.

In a preferred solution, the sensor is a magnetic sensor, and the key is provided with a magnetic element matched with the sensor.

In a preferred solution, the sensor is a photoelectric sensor, and the key is provided with a light-shielding element matched with the sensor.

DETAILED DESCRIPTION OF THE EMBODIMENTS

Embodiment 1

Figure 1:
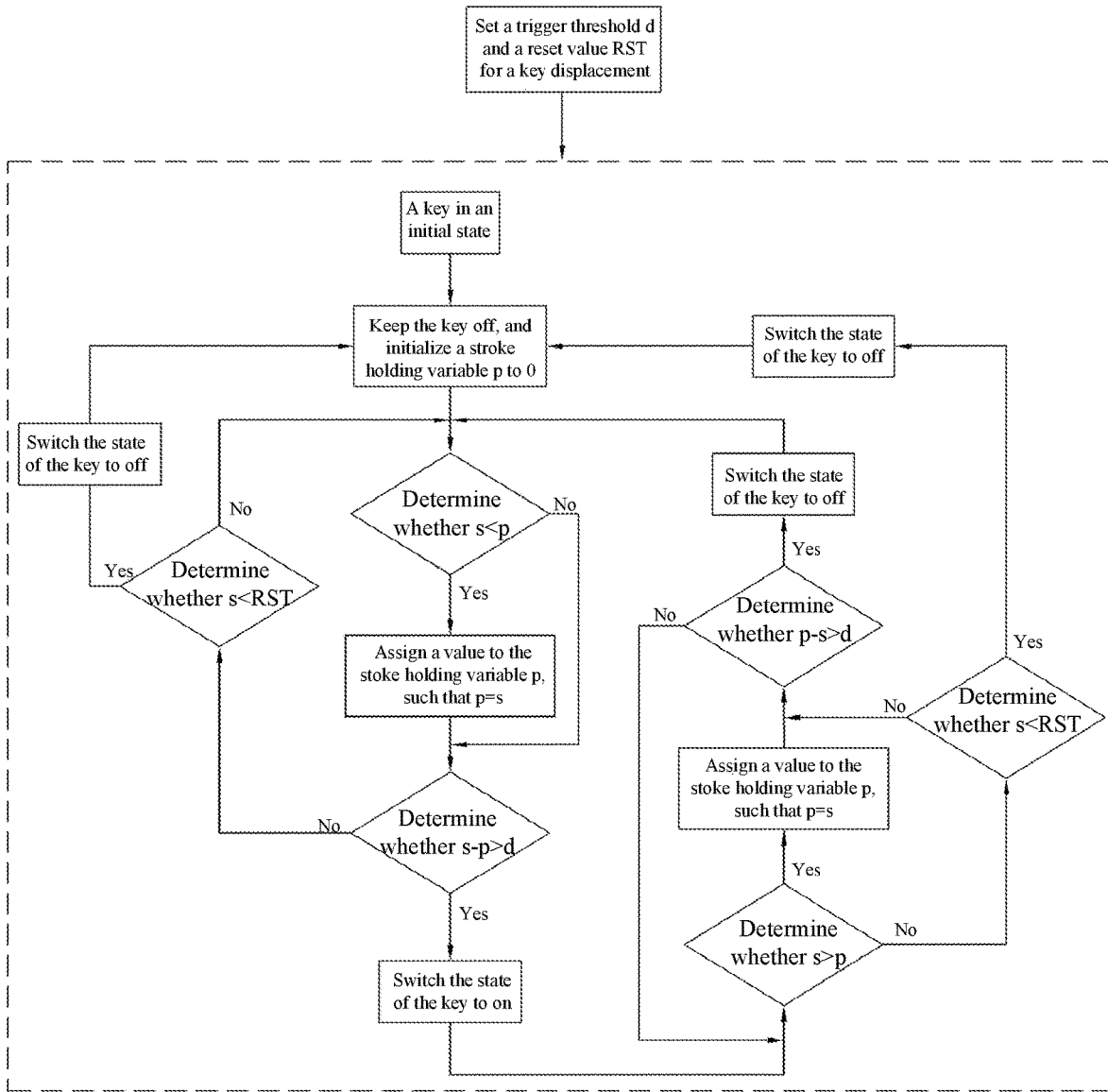
FIG. 1 is a flowchart of a key triggering method according to the present disclosure.

As shown in FIG. 1, in the present disclosure, a key triggering method is implemented through a main controller and a sensor for detecting a displacement variable s of a key. The sensor recognizes and converts a change of a physical quantity of a key displacement into a changing electrical signal. The main controller receives the changing electrical signal fed back by the sensor and converts it into the displacement variable s of the key. The main controller is a micro-control chip for controlling a keyboard device.

In the present disclosure, the key triggering method specifically includes the following steps.

1) Setting

S01 and S02. A user communicates with the main controller and sets various parameters through an operation interface on an operating device such as a computer or a mobile terminal. The main controller receives a setting instruction of the operating device, and sets a trigger threshold d and a reset value RST of a key displacement. A maximum stroke of the key is L, and a setting range of the trigger threshold d is 0<d≤L. The maximum stroke L of the key is a physical parameter of a key structure, and is determined by a specification of the key structure. The set value of the reset value RST is greater than zero, and the reset value RST is generally less than or equal to the currently set trigger threshold d. In daily use, the key of the keyboard will actually vibrate slightly due to the influence of a surrounding object or user operation. By setting the reset value RST to perform a forced reset, the key can be avoided from being triggered by mistake during use, thus improving the user experience. In addition, through parameter adjustment, the user can customize the key touch, which is suitable for users with different types of hands.

2) Execution

S1. When the sensor detects that the key is in a natural state, the main controller determines that the key is in an off state, and initializes a stroke holding variable p to 0.

S1-1. When the main controller determines that the displacement variable s increases and the displacement variable s is greater than the preset trigger threshold d, the main controller switches the key to an on state and synchronizes a value of the displacement variable s with a value of the stroke holding variable p.

S2. The main controller determines a switch state of the key and determines whether a total value change trend of the displacement variable s is increasing or decreasing. The total value change trend is determined according to a current switch state of the key. When the key is off, the total value change trend is decreasing. When the key is on, the total value change trend is increasing.

S3. When a value change trend of the displacement variable s is the same as the total value change trend and the stroke holding variable p is unlocked, the main controller keeps a value of the stroke holding variable p synchronized with a value of the displacement variable s.

S4. When the value change trend of the displacement variable s changes, the value of the stroke holding variable p is locked to the value of the displacement variable s before the change.

S5. When an absolute value of a relative movement of the key, namely |s−p|, satisfies |s−p|>d, d being a trigger threshold, the switch state of the key and the total value change trend are switched to opposites of a current switch state and a current total value change trend, respectively. The value of the stroke holding variable p is unlocked, and the synchronization of the value of the stroke holding variable p with the value of the displacement variable s is restored. The operation returns to step S3. When the value change trend of the displacement variable s is restored to the current total value change trend and the value of the displacement variable s is equal to the value of the stroke holding variable p, the stroke holding variable p is unlocked, and the synchronization of the value of the stroke holding variable p with the value of the displacement variable s is restored. The operation returns to step S3. The absolute value of the relative movement |s−p| includes a relative movement value of p−s for raising in an on state and a relative movement value of s−p for pressing in an off state.

S6. Steps S2 to S5 are repeated until the key restores to the natural state or the displacement variable s is less than the reset value RST, and the operation returns to step S1.

During the execution process, when the key is in a natural state or the displacement variable s is less than the reset value RST, the stroke holding variable p is initialized to 0.

Step 1-1 involves a specific process from the natural state to initial triggering.

In this embodiment, the sensor is a Hall sensor, and the key is provided with a magnet matched with the sensor. The sensor detects a magnetic flux generated by the magnet and converts it into an electrical signal. The main controller converts the received electrical signal into the displacement variable s of the key according to a preset parameter comparison table of the Hall sensor.

Specifically, when the switch state of the key in step S2 is off, steps S3 to S5 are as follows.

S3 and S4. It is determined whether the value of the displacement variable s is less than the value of the stroke holding variable p. If yes, the main controller assigns a current value of the displacement variable s to the stroke holding variable p. If not, the stroke holding variable p remains unchanged.

S5. It is determined whether a value of a relative movement, namely s−p, for pressing the key satisfies s−p>d. If yes, the switch state of the key is switched to on, the total value change trend is switched to increasing, and the value of the stroke holding variable p is unlocked and restored to be synchronized with the value of the displacement variable s. The operation returns to step S2. If not, the operation returns to steps S3 and S4.

Specifically, when the switch state of the key in step S2 is on, steps S3 to S5 are as follows.

S3 and S4. It is determined whether the value of the displacement variable s is greater than the value of the stroke holding variable p. If yes, the main controller assigns a current value of the displacement variable s to the stroke holding variable p. If not, the stroke holding variable p remains unchanged.

S5. It is determined whether a value of a relative movement, namely p−s, for raising the key satisfies p−s>d. If yes, the switch state of the key is switched to off, the total value change trend is switched to decreasing, and the value of the stroke holding variable p is unlocked and restored to be synchronized with the value of the displacement variable s. The operation returns to step S2. If not, the operation returns to steps S3 and S4.

Figure 2:
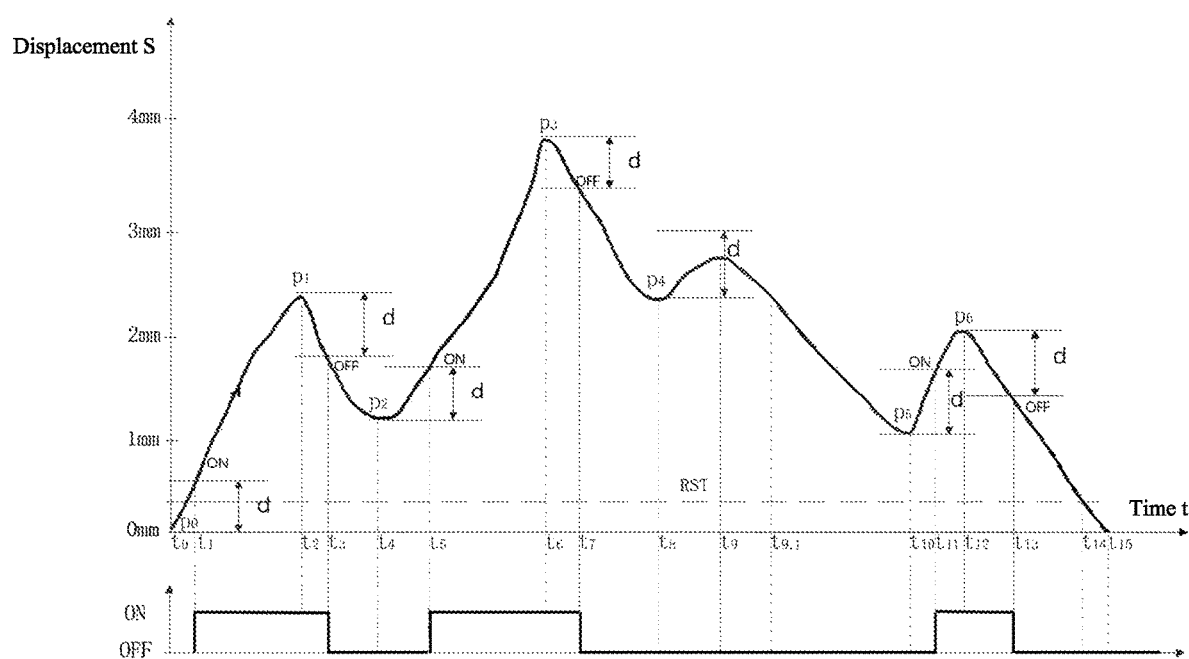
FIG. 2 is a schematic diagram of a state change of a press action according to Embodiment 1 of the present disclosure.

As shown in FIG. 2, the maximum stroke L of the key is set to 4 mm. A working example of the present disclosure is as follows.

At $t_0$, the key is in the off state. The stroke holding variable p is initialized to $p=p_0=0$ mm, and remains unchanged. When the key is pressed down from the natural state, the displacement variable s increases.

At $t_1$, a difference between the displacement variable s of the key and the stroke holding variable $p_0$ is greater than the trigger threshold d, that is, the relative movement value s−p>d. The key is switched from the off state to the on state, and the displacement variable s is assigned to the stroke holding variable p.

At $t_2$, the displacement variable s decreases, that is, the key is raised from being pressing down. The main controller stops assigning the displacement variable s to the stroke holding variable p. At this time, $p=p_1$, and it remains unchanged. At $t_3$, an absolute value of the relative movement $|s-p_1|$ is greater than the trigger threshold d. The key is switched from the on state to the off state, and the displacement variable s is assigned to the stroke holding variable p.

At $t_4$, the key is pressed down again. At this time, $p=p_2$, and it remains unchanged. At $t_5$, the absolute value of the relative movement $|s-p_2|$ is greater than the trigger threshold d. The key is switched from the off state to the on state, and the displacement variable s is assigned to the stroke holding variable p.

At $t_6$, the key is raised. At this time, $p-p_3$, and it remains unchanged. At $t_7$, the absolute value of the relative movement $|s-p_3|$ is greater than the trigger threshold d. The key is switched from the on state to the off state, and the displacement variable s is assigned to the stroke holding variable p.

At $t_8$, the key is pressed down. At $t_9$, the key is raised. At $t_8$, $p-p_4$, and it remains unchanged. During a period from $t_8$ to $t_{9.1}$, the absolute value of the relative movement $|s-p_4|$ is not greater than the trigger threshold d, and the key remains off. After $t_{9.1}$, the displacement variable s is less than $p_4$. The main controller assigns the displacement variable s to the stroke holding variable p.

At $t_{10}$, the key is pressed again. At this time, $p=p_5$, and it remains unchanged. At $t_{11}$, the absolute value of the relative movement $|s-p_5|$ is greater than the trigger threshold d. The key is switched from the off state to the on state, and the displacement variable s is assigned to the stroke holding variable p.

At $t_{12}$, the key is released until it restores to the natural state at $t_{15}$. At $t_{12}$, $p=p_6$, and it remains unchanged. At $t_{13}$, the absolute value of the relative movement $|s-p_6|$ is greater than the trigger threshold d. The key is switched from the on state to the off state, and the displacement variable s is assigned to the stroke holding variable p. At $t_{14}$, the displacement variable s is less than the reset value RST. The key is forced into an off state, and the stroke holding variable p is initialized to 0 mm. The main controller stops assigning the displacement variable s to the stroke holding variable p.

Therefore, when performing a key operation, the user does not need to first raise the key to the natural state and then press the key to achieve key triggering. This method can execute the input of a key character signal through repeated press and raise operations of a short stroke under a press state. This method is easy for the user to operate the key repeatedly and fast, can respond to the user operation sensitively, and is compatible with a normal key operation process, thus reducing the learning cost of the user to zero.

Embodiment 2

Figure 3:
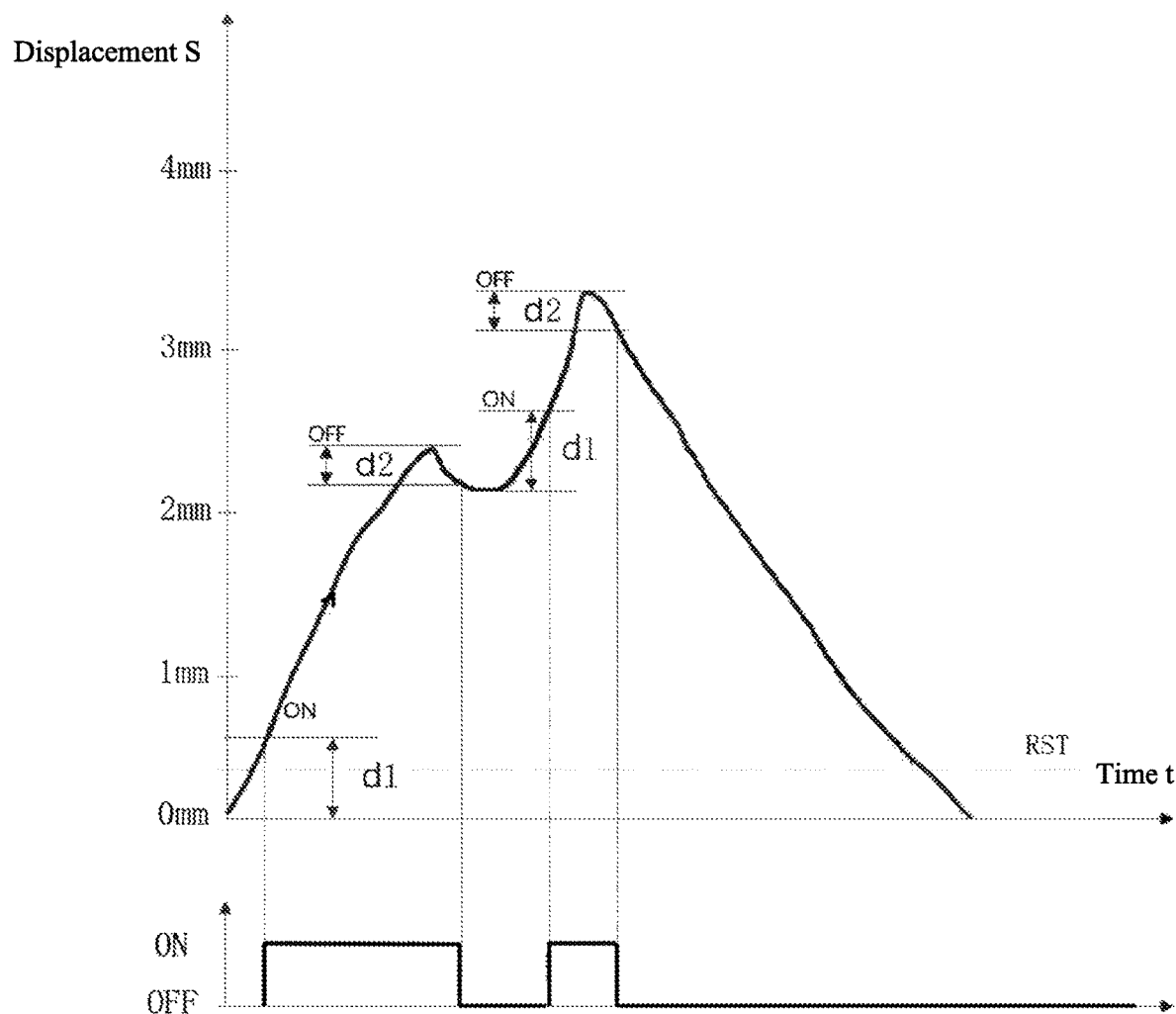
FIG. 3 is a schematic diagram of a state change of a press action according to Embodiment 2 of the present disclosure.

As shown in FIG. 3, this embodiment differs from Embodiment 1 as follows.

The trigger threshold d includes a relative trigger threshold d1 for pressing and a relative trigger threshold d2 for raising. In steps S1 to S6, when the displacement variable s increases, the trigger threshold d is equal to the relative trigger threshold d1 for pressing, and when the displacement variable s decreases, the trigger threshold d is equal to the relative trigger threshold d2 for raising.

The trigger threshold d is divided into the relative trigger threshold d1 for pressing and the relative trigger threshold d2 for raising, which is easy for the user to modify the trigger sensitivity of the key and freely define the trigger touch according to his/her own usage habit, so as to improve the user experience.

Embodiment 3

This embodiment differs from Embodiment 1 as follows.

The sensor is a photoelectric sensor, and the key is provided with a light-shielding element matched with the sensor.

In this embodiment, the light-shielding element is provided with a light-transmitting hole. A light transmission area of the light-transmitting hole gradually increases or decreases along an axis direction of the key. The photoelectric sensor detects the luminous flux and feeds back the electrical signal to the main controller. The main controller converts the received electrical signal into the displacement variable s of the key according to a preset parameter of the photoelectric sensor.

Embodiment 4

This embodiment differs from Embodiment 1 as follows.

The sensor is a pressure sensor, and the key or an axis seat is provided with a press element matched with the sensor. The sensor generates a corresponding electrical signal according to a pressure applied by the press element. The main controller converts the received electrical signal into the displacement variable s of the key according to a preset parameter of the pressure sensor.

Although the embodiments of the present disclosure are described based on practical solutions, it does not constitute a restriction on the content of the present disclosure. It is obvious that those skilled in the art can modify or combine the implementation solution of the present disclosure with other solutions according to this specification.

What is claimed is:

1. A key triggering method, implemented through a main controller for receiving an electrical signal fed back by a sensor and the sensor for detecting a displacement variable s of a key, the key triggering method comprising the following triggering steps:
   S1: when the sensor detects that the key is in a natural state, determining, by the main controller, that the key is in an off state, and initializing a stroke holding variable p to 0;
   S2: determining, by the main controller, a switch state of the key, and determining whether a total value change trend of the displacement variable s is increasing or decreasing;
   S3: when a value change trend of the displacement variable s is the same as the total value change trend and a value of the stroke holding variable p is unlocked, keeping, by the main controller, the value of the stroke holding variable p synchronized with a value of the displacement variable s;
   S4: when the value change trend of the displacement variable s changes, locking the value of the stroke holding variable p to the value of the displacement variable s before the change;
   S5: when an absolute value of a relative movement of the key, namely |s−p|, satisfies |s−p|>d, d being a trigger threshold, switching the switch state of the key and the total value change trend to opposites of a current switch state and a current total value change trend, respectively; unlocking the value of the stroke holding variable p, and restoring a synchronization of the value of the stroke holding variable p with the value of the displacement variable s; and
   S6: repeating steps S2 to S5 until the key restores to the natural state, and returning to step S1.

2. The key triggering method according to claim 1, wherein step S5 further comprises: when the value change trend of the displacement variable s is restored to the current total value change trend and the value of the displacement variable s is equal to the value of the stroke holding variable p, unlocking the value of the stroke holding variable p, restoring the synchronization of the value of the stroke holding variable p with the value of the displacement variable s, and returning to step S3.

3. The key triggering method according to claim 1, wherein when the switch state of the key in step S2 is off, steps S3 to S5 are as follows:
   S3 and S4: determining whether the value of the displacement variable s is less than the value of the stroke holding variable p; if the value of the displacement variable s is less than the value of the stroke holding variable p, assigning, by the main controller, a current value of the displacement variable s to the stroke holding variable p; and if the value of the displacement variable s is great than or equal to the value of the stroke holding variable p, remaining the stroke holding variable p unchanged; and
   S5: determining whether a value of a relative movement, namely s−p, for pressing the key satisfies s−p>d; if the value of the relative movement, namely s−p, for pressing the key satisfies s−p>d, switching the switch state of the key to on, switching the total value change trend to increasing, unlocking the value of the stroke holding variable p, restoring the synchronization of the value of the stroke holding variable p with the value of the displacement variable s, and returning to step S2; and if the value of the relative movement, namely s−p, for pressing the key satisfies s−p≤d, returning to steps S3 and S4.

4. The key triggering method according to claim 1, wherein when the switch state of the key in step S2 is on, steps S3 to S5 are as follows:
- S3 and S4: determining whether the value of the displacement variable s is greater than the value of the stroke holding variable p; if the value of the displacement variable s is greater than the value of the stroke holding variable p, assigning, by the main controller, a current value of the displacement variable s to the stroke holding variable p; and if the value of the displacement variable s is less than or equal to the value of the stroke holding variable p, remaining the stroke holding variable p unchanged; and
- S5: determining whether a value of a relative movement, namely p−s, for raising the key satisfies p−s>d; if the value of the relative movement, namely p−s, for raising the key satisfies p−s>d, switching the switch state of the key to off, switching the total value change trend to decreasing, unlocking the value of the stroke holding variable p, restoring the synchronization of the value of the stroke holding variable p with the value of the displacement variable s, and returning to step S2; and if the value of the relative movement, namely p−s, for raising the key satisfies p−s≤d, returning to steps S3 and S4.

5. The key triggering method according to claim 1, wherein a maximum stroke of the key is L, and a setting range of the trigger threshold d is 0<d≤L.

6. The key triggering method according to claim 1, further comprising step S01 before step S1: setting, by a user, the trigger threshold d for a key displacement through the main controller.

7. The key triggering method according to claim 1, further comprising step S02 before step S1: setting, by a user, a reset value of the key through the main controller, wherein in steps S1 to S6, when the displacement variable s is less than the reset value, the switch state of the key is forcibly switched to the off state, and the stroke holding variable p is initialized to 0.

8. The key triggering method according to claim 1, wherein; the trigger threshold d comprises a relative trigger threshold d1 for pressing and a relative trigger threshold d2 for raising; and in steps S2 to S5, when the displacement variable s increases, the trigger threshold d is equal to the relative trigger threshold d1 for pressing, and when the displacement variable s decreases, the trigger threshold d is equal to the relative trigger threshold d2 for raising.

9. The key triggering method according to claim 1, wherein the sensor is a magnetic sensor and the key is provided with a magnetic element, and wherein the magnetic element is matched with the sensor.

10. The key triggering method according to claim 1, wherein the sensor is a photoelectric sensor and the key is provided with a light-shielding element, and wherein the light-shielding element is matched with the sensor.

* * * * *